United States Patent [19]
Goldstein et al.

[11] Patent Number: 6,144,781
[45] Date of Patent: Nov. 7, 2000

[54] SYMMETRICAL OPTICAL MATRIX CROSSCONNECT APPARATUS AND METHOD THEREFOR

[75] Inventors: Evan Lee Goldstein, Princeton; Lih-Yuan Lin, Middletown; Jane Marie Simmons, Eatontown, all of N.J.

[73] Assignee: AT&T Corp., New York, N.Y.

[21] Appl. No.: 09/002,240

[22] Filed: Dec. 31, 1997

[51] Int. Cl.[7] .............................. G02B 6/26; G02B 6/42
[52] U.S. Cl. .............................. 385/18; 385/16; 385/17; 385/19; 385/20; 385/47
[58] Field of Search ................................ 385/18, 16, 17, 385/19, 20, 47

[56] References Cited

U.S. PATENT DOCUMENTS 5,642,446  6/1997  Tsai ............................................ 385/18

OTHER PUBLICATIONS

Hiroshi Toshiyoshi and Hiroyuki Fujita, "Electrostatic Mirco Torsion Mirrors for an Optical Switch Matrix", Journal of Microelectromechanical Systems, vol. 5, No. 4, Dec., 1996, pp. 231–237.

*Primary Examiner*—Rodney Bovernick
*Assistant Examiner*—Robert E. Wise

*Attorney, Agent, or Firm*—Oliff & Berridge, PLC

[57] ABSTRACT

A symmetrical optical matrix crossconnect apparatus includes a plurality of optical switch devices with each comprising a first pair of fiber optic ports, a second pair of fiber optic ports and a reflective element. The first pair of fiber optic ports are disposed apart from one another and aligned coextensively along a first optical path. One of the first pair of fiber optic ports emits a first light beam that travels along the first optical path in free space while the remaining one of the first pair of fiber optic ports receives the first light beam. The second pair of fiber optic ports are disposed apart from one another and aligned coextensively along a second optical path. A first one of the second pair of fiber optic ports emits a second light beam that travels along the second optical path in free space while a remaining one of the second pair of fiber optic ports receives the second light beam. The first optical path and the second optical path crisscross each other at an intersection. The reflective element has a first and an opposite second reflective surface and moves between a non-reflective state and a reflective state. In the non-reflective state, the reflective element is disposed away from the first and second optical paths. In the reflective state, the reflective element is interposed into the first and second optical paths at the intersection to reflect the first light beam to a light receiving one of the second pair of fiber optic ports while reflecting the second light beam to the light receiving one of the first pair of fiber optic ports.

19 Claims, 18 Drawing Sheets

SYMMETRICAL OPTICAL MATRIX CROSSCONNECT APPARATUS AND METHOD THEREFOR

BACKGROUND OF THE INVENTION

1. Field of Invention

The present invention is directed to an optical switch device for use in fiber optic cable communications systems. More specifically, the present invention is directed to a symmetrical matrix crossconnect apparatus used for redirecting light beams traveling in free-space in order to change routing of the fiber optic cable telecommunications network.

2. Description of Related Art

To meet the demand for communications, many telecommunications providers are building ground-based fiber optic network systems. Such a fiber optic cable telecommunications network is illustrated by way of example in FIG. 1. A plurality of switching stations $S_1$–$S_n$ are located throughout a service area. The switching stations $S_1$–$S_n$ are interconnected by a plurality of fiber optic cable trunk lines T. Because fiber optic cable is capable of carrying significantly more telecommunication signals than the antiquated copper wire systems, switching for the purpose of rerouting the fiber optic cable trunk lines remains a concern.

With reference to FIG. 1, switching station $S_1$ is connected to two trunk lines $T_a$ and $T_b$ located in a region $R_1$ of the service area shown in FIG. 1. Currently, trunk lines $T_a$ and $T_b$ are connected to each other by a fully-connected crossconnect and particularly by a 4×4 crossconnect as shown by way of example in FIG. 2. For fiber optic cables labeled link 1–4 IN from trunk line $T_a$ can be connected to any of the fiber optic cables labeled link 1–4 OUT that comprise trunk line $T_b$. In this example, the fiber optic cable link 2 IN is connected to the fiber optic cable link 1 OUT. This fully-connected 4×4 crossconnect enables any fiber optic cable link 1–4 IN to be connected to any fiber optic cable link 1–4 OUT.

In order to connect any input to any output of the 4×4 crossconnect in FIG. 2, a free-space optical matrix crossconnect 4 is required as shown in FIG. 3. The free-space optical matrix crossconnect includes four rows and four columns of optical switch devices 6. Such optical switch devices 6 are discussed in detail in Journal of Microelectromechanical Systems, Vol. 5, No. 4, December 1996, entitled "Electrostatic Micro Torsion Mirrors for an Optical Switch Matrix" by Hiroshi Toshiyoshi and Hiroyuki Fujita. Each optical switch device 6 includes a base member 8, an actuator 10, and a reflective element 12 having a single reflective surface. The reflected element 12 is pivotally connected to the base member 8. The actuator 10 is connected to the base member 8 and the reflective element 12. Also, the actuator 10 is operative to cause the reflective elements to move to and between a reflective state and a non-reflective state. By way of example only, only two reflective elements 12 are in the reflective state as shown in column C1, row R2 and column C3, row R4. Specifically, a light beam $L_1$ represented by a first dotted line is emitted from link 1 IN and reflected by the reflected element 12 to link 2 OUT and a light beam $L_2$ represented by a second dotted line is emitted from link 3 IN and is reflected by the reflective element 12 to link 4 OUT. The remaining reflective elements are in the non-reflective state which permits any light beam to travel across the free-space optical matrix crossconnect along their respective optical paths without interference. Thus, to fabricate the fully-connected 4×4 crossconnect, sixteen (16), i.e., 4×4, optical switch devices 6 are required.

An N×N free-space optical matrix crossconnect 14 to facilitate N number of IN links and N number of OUT links is illustrated in FIG. 4. To fabricate a fully-connected free-space optical matrix crossconnect, N×N optical switch devices are required. Experts in the telecommunications industry predict that within the near future large crossconnects will be required on the order of N=512. For 512×512 optical matrix crossconnect, 262,144 (i.e., 512×512) optical switch devices will be required. Fabricating a 512×512 fully-connected optical matrix crossconnect will be a daunting task.

SUMMARY OF THE INVENTION

A symmetrical optical matrix crossconnect apparatus of the present invention is fabricated from a plurality of optical switch devices. Each optical switch device includes a first pair of fiber optic ports, a second pair of fiber optic ports, and a reflective element. The first pair of fiber optic ports are disposed apart from one another and align coextensively along a first optical path along which a first light beam travels. The second pair of fiber optic ports are disposed apart from one another and align coextensively along a second optical path along which a second light beam travels. The first optical path and the second optical path crisscross each other at an intersection.

The reflective element moves between a non-reflective state and a reflective state. In the non-reflective state, the reflective element is disposed away from the first and second optical paths. In the reflective state, the reflective element is interposed into the first and second optical paths at the intersection. Also, in the reflective state, the first light beam emitted by a light-emitting one of the first pair of fiber optic ports reflects from the reflective element to a light-receiving one of the second pair of fiber optic ports while the second light beam emitted by a light-emitting one of the second pair of fiber optic ports reflects from the reflective element to a light-receiving one of the first pair of fiber optic ports.

The present invention takes advantage of the concept of symmetry to achieve the same number of link connections with a 75% reduction in the number of optical switch devices. Communications is considered symmetrical because, for example, calling party A communicates with called party B while simultaneously called party B communicates with calling party A. If A goes to B and B, in turn, goes to A, symmetry is achieved. With symmetry, N/2×N/2 symmetrical crossconnect apparatuses of the present invention can perform the same function as an N×N fully-connected crossconnect apparatus. Therefore, if N=512, then 262,144 optical switch devices are required. With a N/2×N/2 symmetrical crossconnect apparatus and N=512, only 65,536 (i.e., 256×256) optical switch devices are required. This is a 75% reduction in the total number of optical switch devices needed in the symmetrical crossconnect apparatus of the present invention to perform the same function as the 512×512 fully-connected optical matrix crossconnect. By comparison, a 4×4 fully-connected N×N crossconnect requires 16 (i.e., 4×4) optical switch devices, the N/2×N/2 symmetrical crossconnect apparatus of the present invention requires only 4 (i.e., 2×2).

BRIEF DESCRIPTION OF THE DRAWINGS

The invention is described in detail with reference to the following figures wherein like numerals reference like elements, and wherein.

DETAILED DESCRIPTION OF PREFERRED EMBODIMENTS

Figure 1:
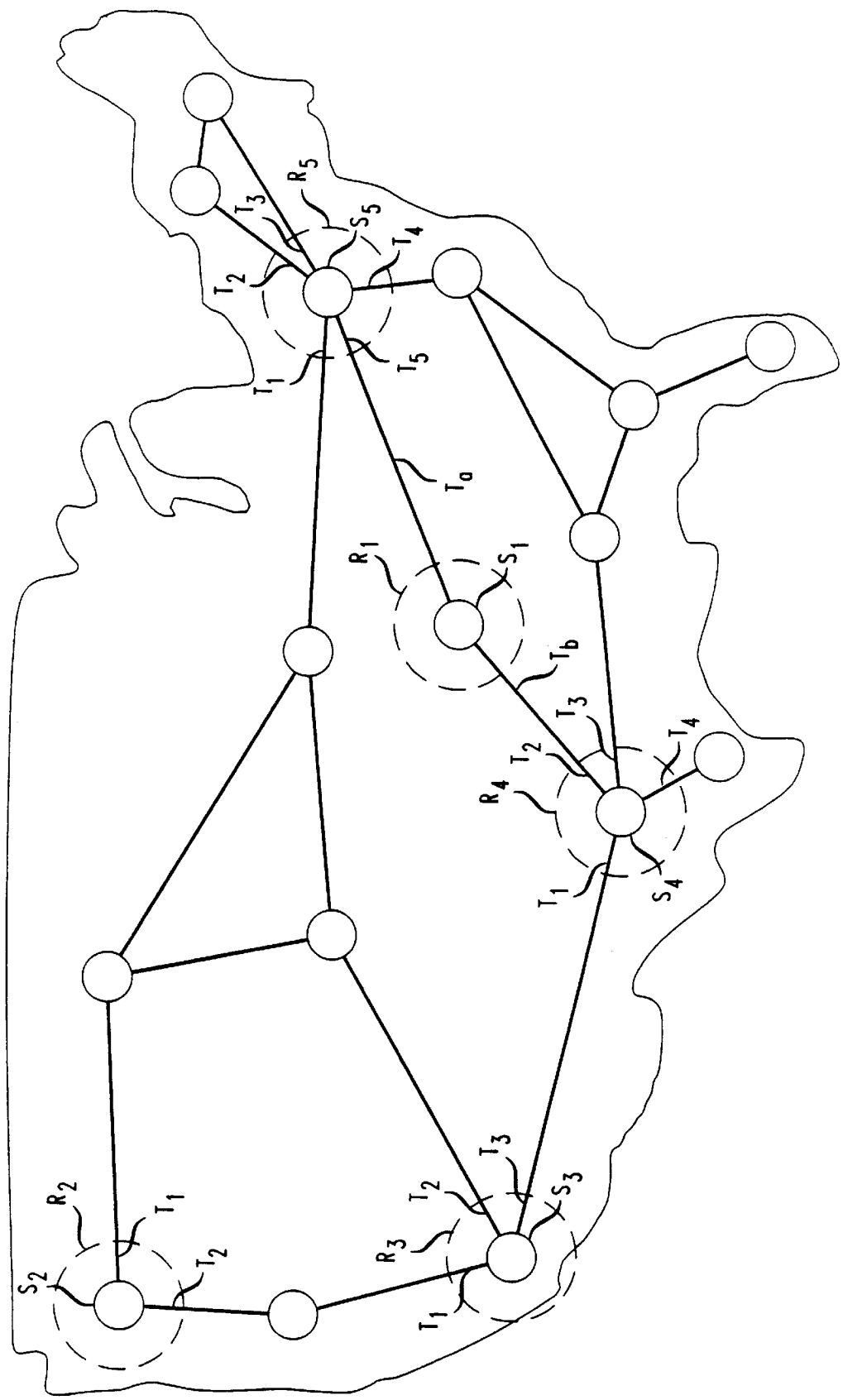
FIG. 1 is a sample map illustrating an arbitrary fiber optic cable communications network showing a plurality of switching stations interconnected by fiber optic cable trunk lines.
Figure 2:
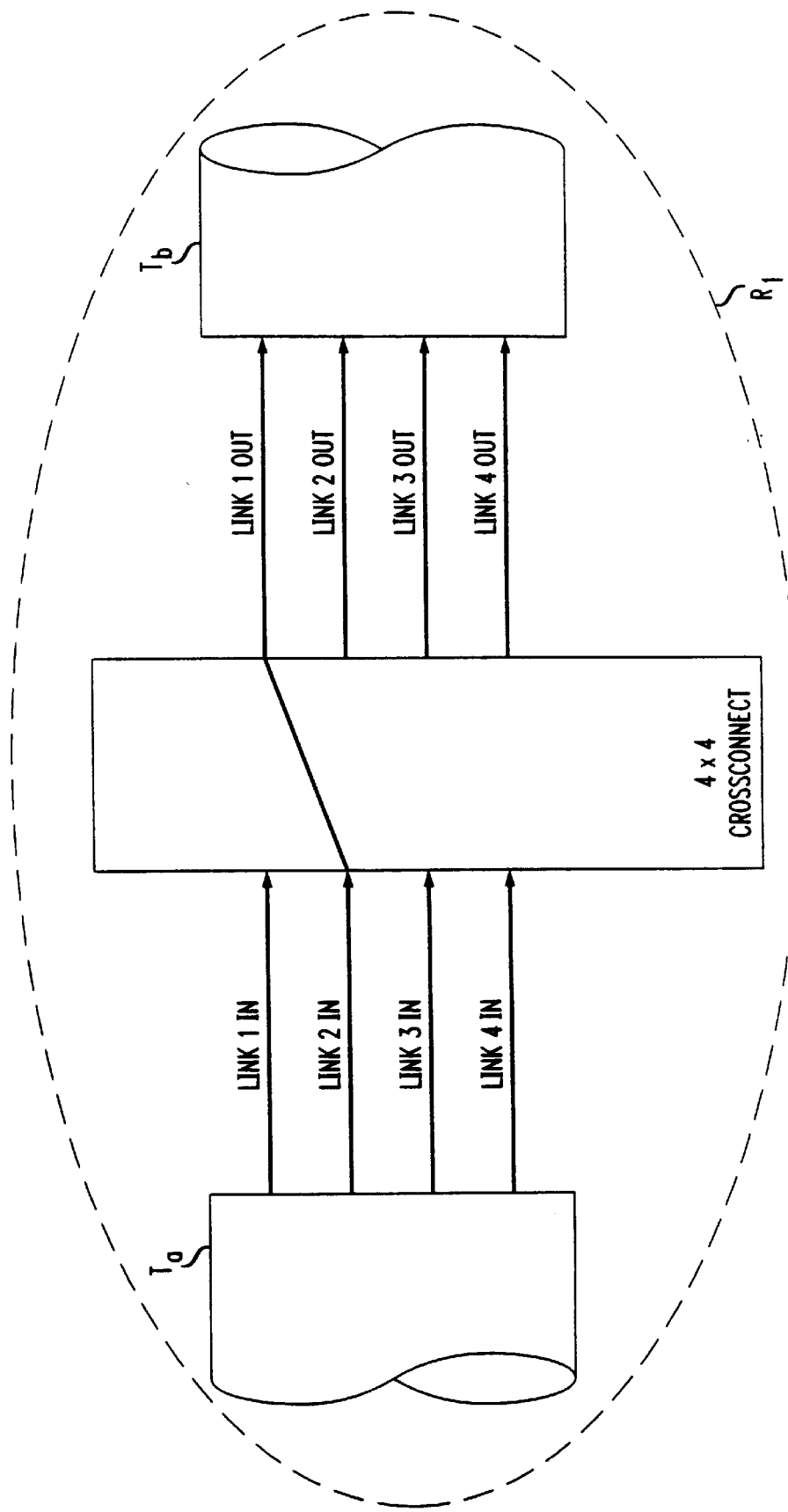
FIG. 2 is a block diagram of a conventional fully-connected 4×4 crossconnect.
Figure 3:
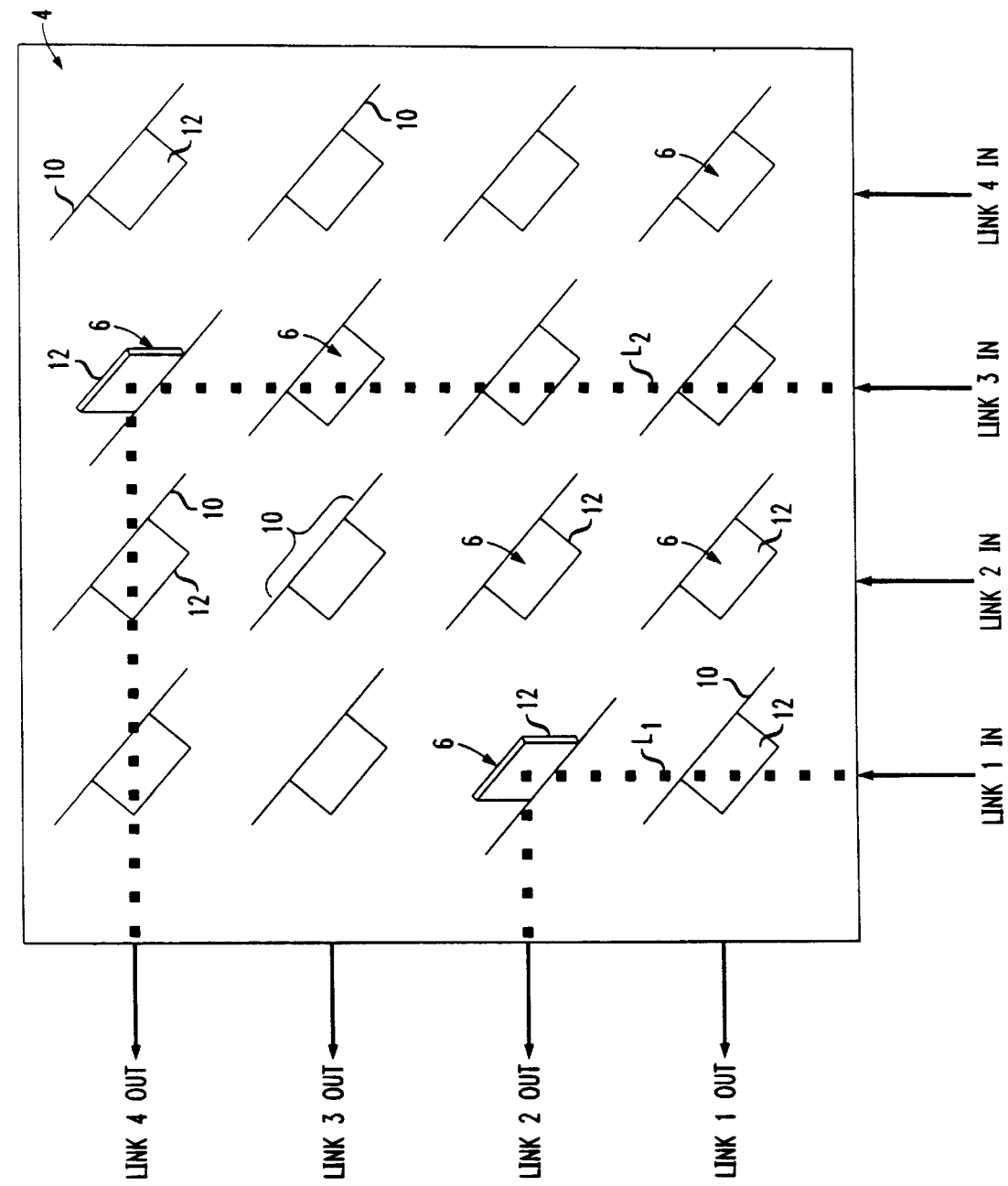
FIG. 3 is a block diagram of the conventional fully-connected, free-space optical matrix crossconnect as shown in FIG. 2.
Figure 4:
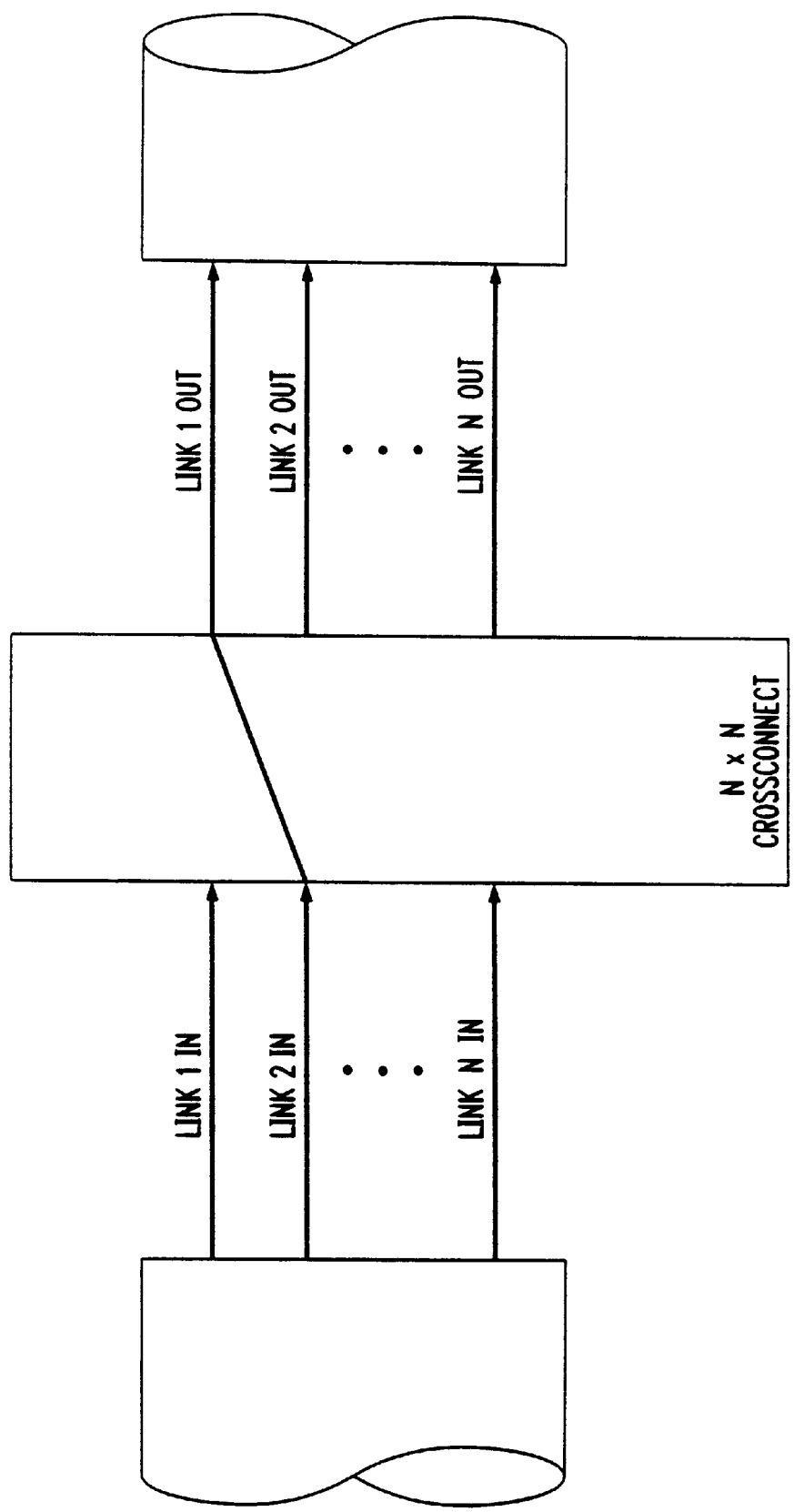
FIG. 4 is a block diagram of a conventional fully-connected N×N, free-space optical matrix crossconnect.

A symmetrical optical matrix crossconnect apparatus of the present invention is hereinafter described. One of ordinary skill in the art would appreciate that the description of the optical switch device used with the symmetrical optical crossconnect apparatus of the present invention is described by way of example only and that other types of optical switch devices could be used to provide similar features and advantages. Furthermore, the sample map illustrated in Prior Art FIG. 1 is used to assist the reader in understanding the application of the symmetrical optical matrix crossconnect apparatus of the present invention. Although the symmetrical optical matrix crossconnect apparatus of the present invention could be retrofitted into any fiber optic cable communications network, a skilled artisan would not construe this sample map as an admission of prior art relevant to the structure of the present invention and inventive concepts discussed herein.

Figure 5:
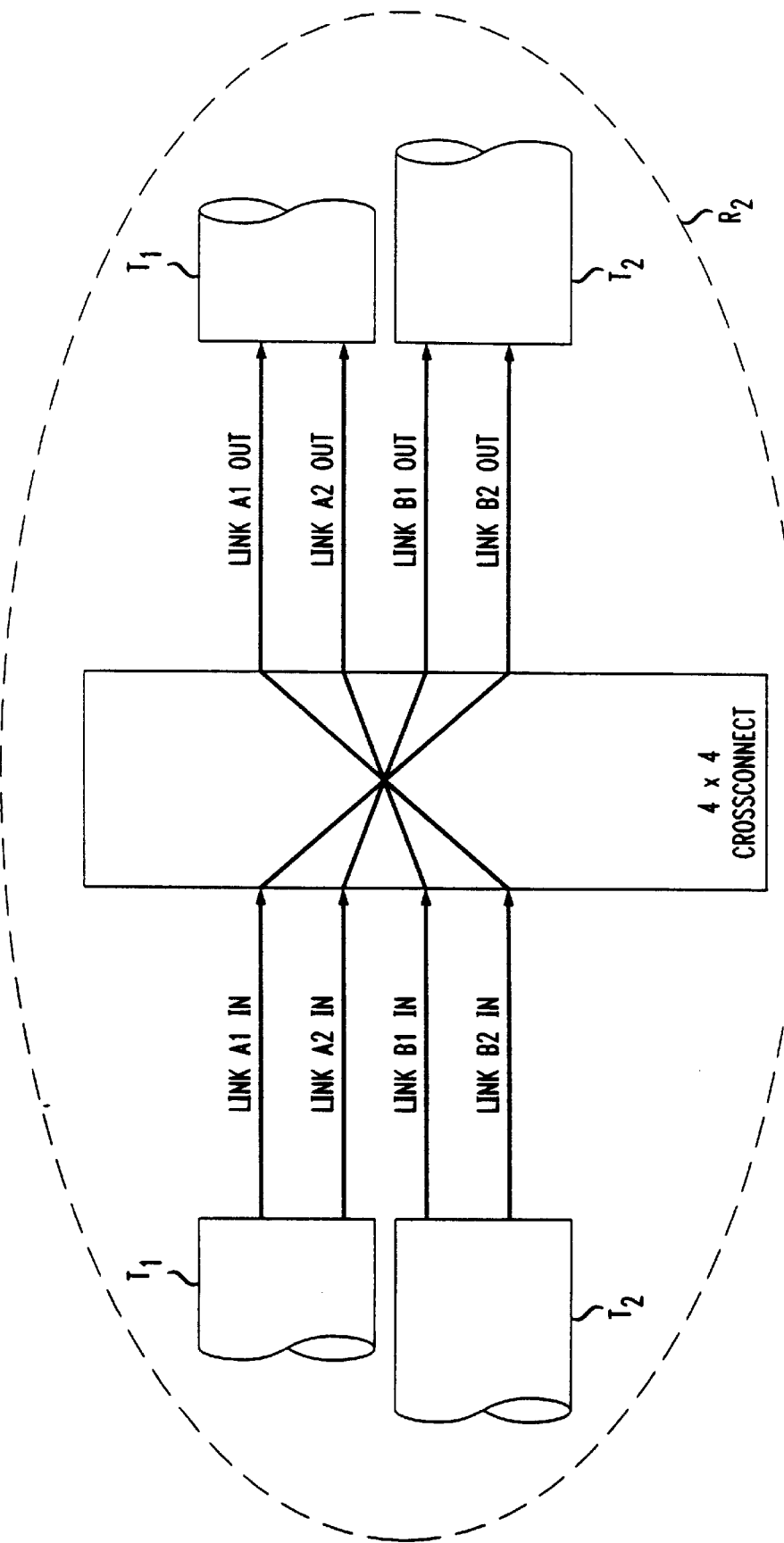
FIG. 5 is a block diagram of a first embodiment of a symmetrical 4×4 optical matrix crossconnect apparatus of the present invention.
Figure 6:
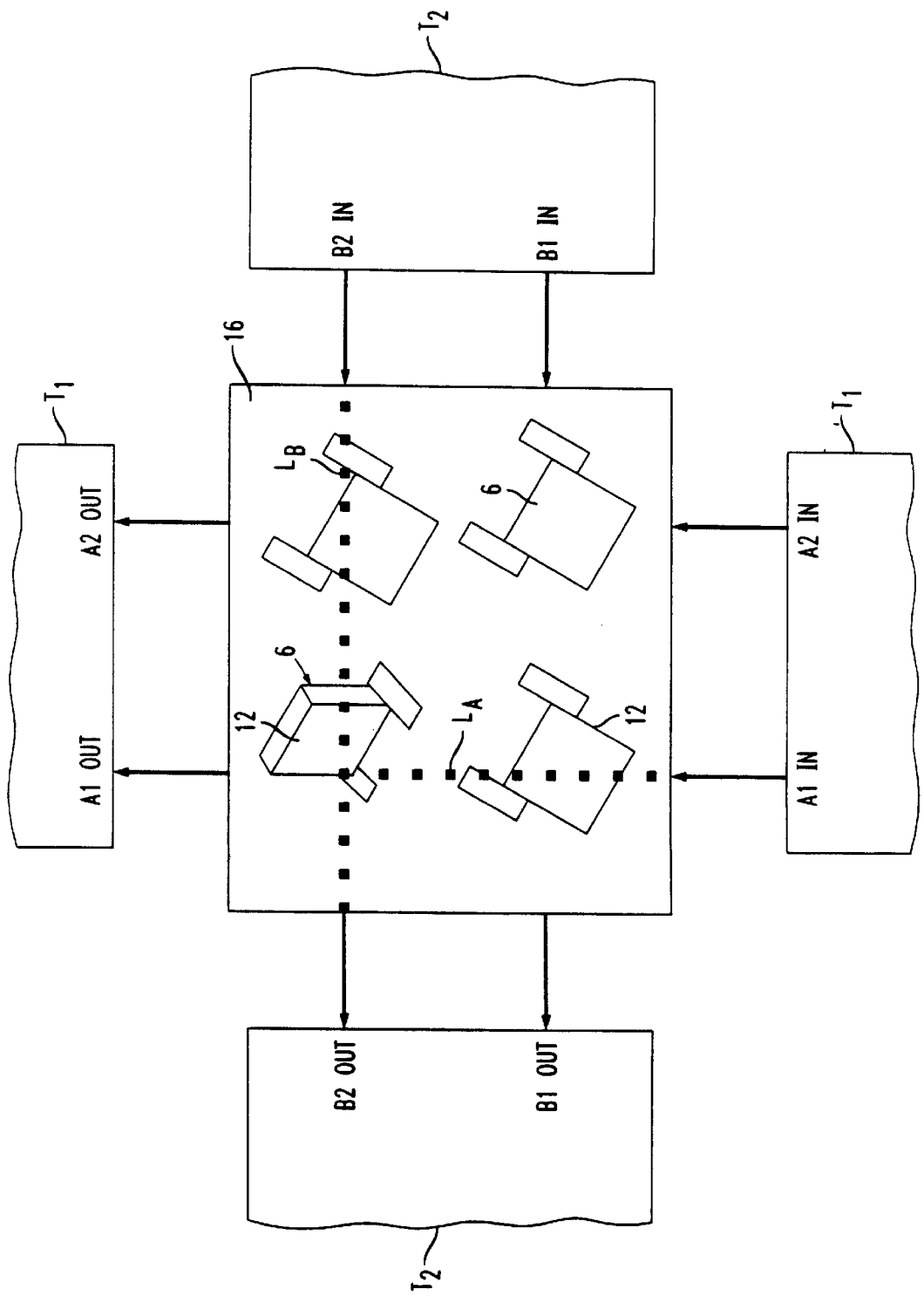
FIG. 6 is a schematic diagram of the symmetrical 4×4 optical matrix crossconnect apparatus of the present invention shown in FIG. 5.

A first embodiment of a symmetrical optical matrix crossconnect apparatus 16 of the present invention is introduced in FIGS. 5 and 6. The first embodiment of the symmetrical optical matrix crossconnect apparatus 16 of the present invention is a 4×4 crossconnect. It is symmetrical because link A1 IN is connected to link B2 OUT while link B2 IN is connected to link A1 OUT. Additionally, link A2 IN is connected to link B1 OUT while link B1 IN is connected to link A2 OUT. By way of example, the symmetrical optical matrix crossconnect apparatus 16 of the present invention can be used at switching station $S_2$ in region R2 in the service area shown in FIG. 1. Trunk line $T_1$ and trunk line $T_2$ are connected to each other at switching station $S_2$ via the symmetrical optical matrix crossconnect apparatus 16 of the present invention.

As shown FIG. 6, the 4×4 symmetrical optical matrix crossconnect apparatus 16 of the present invention uses only four optical switch devices 6. Each of the optical switch devices 6 has a reflective element 12 having a first reflective surface 12a and a second reflective surface 12b. To achieve a symmetrical crossconnection, only one reflective element 12 of the four reflective elements is disposed in the reflective state. In this case, to achieve a symmetrical crossconnection between A1 IN and B2 OUT and between B2 IN and A1 OUT, only one reflective element 12 located in row R2 and column C1 is required to be in the reflective state.

By comparison, a conventional fully-connected optical matrix crossconnect that is a 4×4 crossconnect must use 16 optical switch devices compared to only 4 in the symmetrical optical matrix crossconnect apparatus 16 of the present invention.

A symmetrical optical matrix crossconnect apparatus of the present invention is illustrated in FIG. 6. Each optical switch device 6 includes a reflective element 12 that incorporates a first reflective surface in an opposite second reflective surface. As illustrated in FIG. 6, the light beam L1 is emitted from A1 IN and reflected from the first reflective surface of the reflected element 12 to B2 OUT. Because the optical matrix crossconnect apparatus of the present invention is symmetrical, the light beam L2 emitted from B2 IN is, and must be, reflected from the second reflective surface of the feflective element 12 to A1 OUT. The symmetrical optical matrix crossconnect apparatus of the present invention can achieve the same number of connections as the full-connected crossconnect of the prior art by using only four optical switch devices rather than sixteen. Therefore, the symmetrical optical matrix crossconnect apparatus of the present invention is considered to be an N/2×N/2 matrix in comparison with the N×N fully-connected crossconnect of the prior art.

As illustrated in FIG. 6, a light beam $L_A$ is emitted from A1 IN and is reflected from the first reflective surface 12a of the reflective element 12 in the reflective state and directed to B2 OUT. Simultaneously, a second light beam $L_B$ is emitted from B2 IN and reflected from the reflective second surface 12b of the reflective element 12 in the reflective state and directed to A1 OUT.

Figure 7:
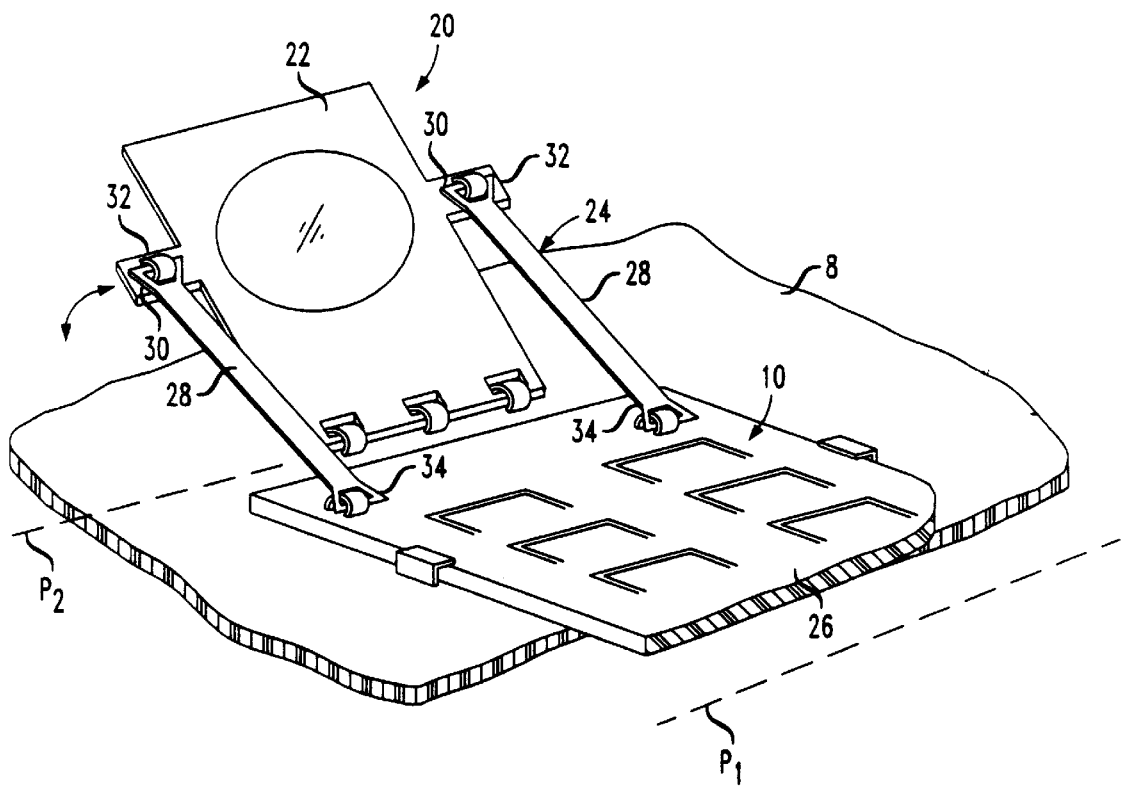
FIG. 7 is a perspective view of an optical switch device used in the symmetrical optical matrix crossconnect of the present invention shown in FIG. 6.
Figure 8:
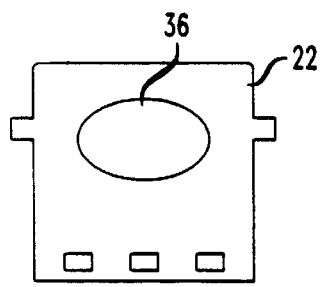
FIG. 8 is a front elevational view of a reflective element of the optical switch device shown in FIG. 7.
Figure 9:
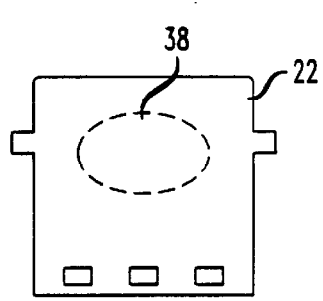
FIG. 9 is a rear elevational view of the reflective element of the optical switch device shown in FIG. 7.
Figure 10:
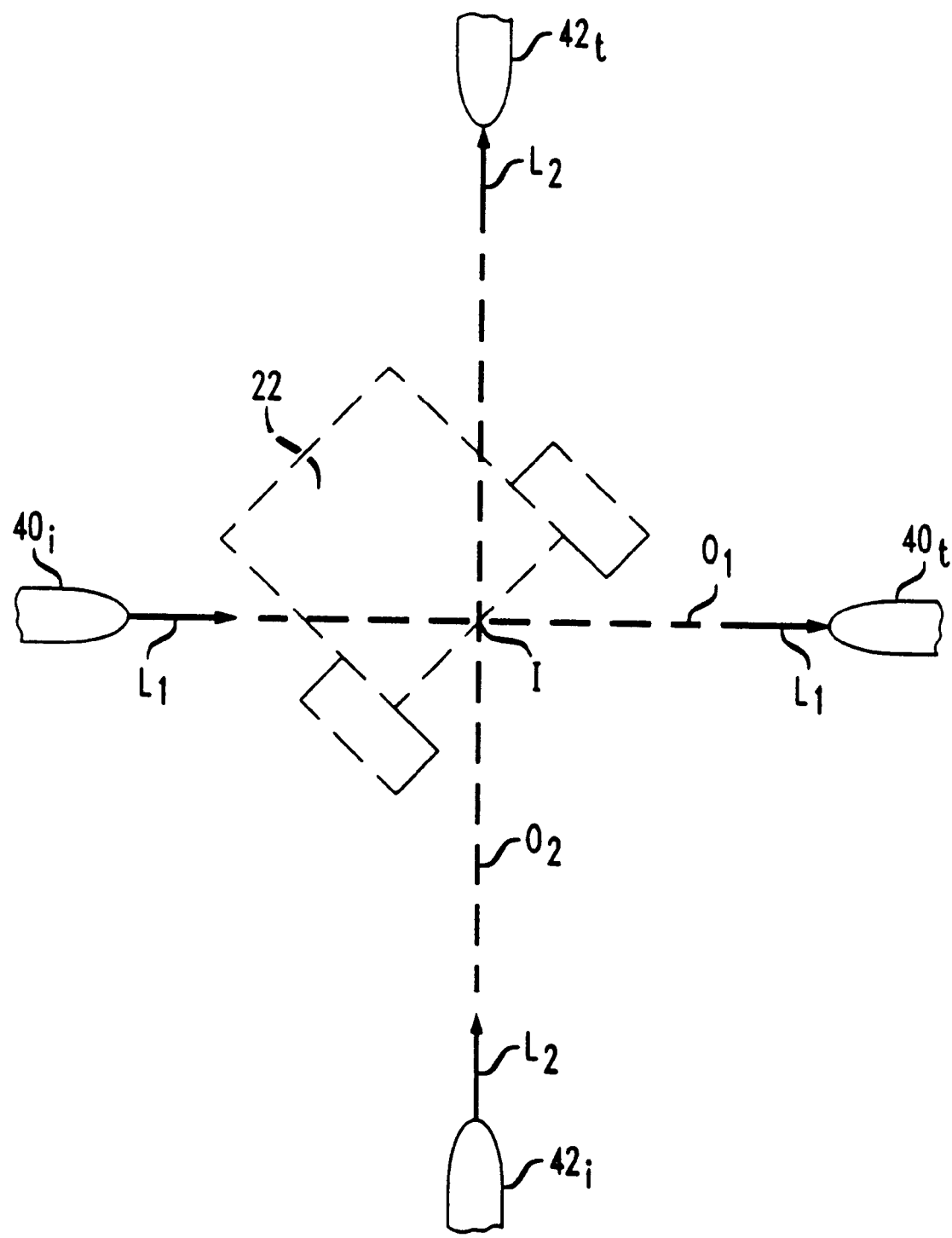
FIG. 10 is a second embodiment of the symmetrical optical matrix crossconnect of the present invention with the reflective element in a non-reflective state.
Figure 11:
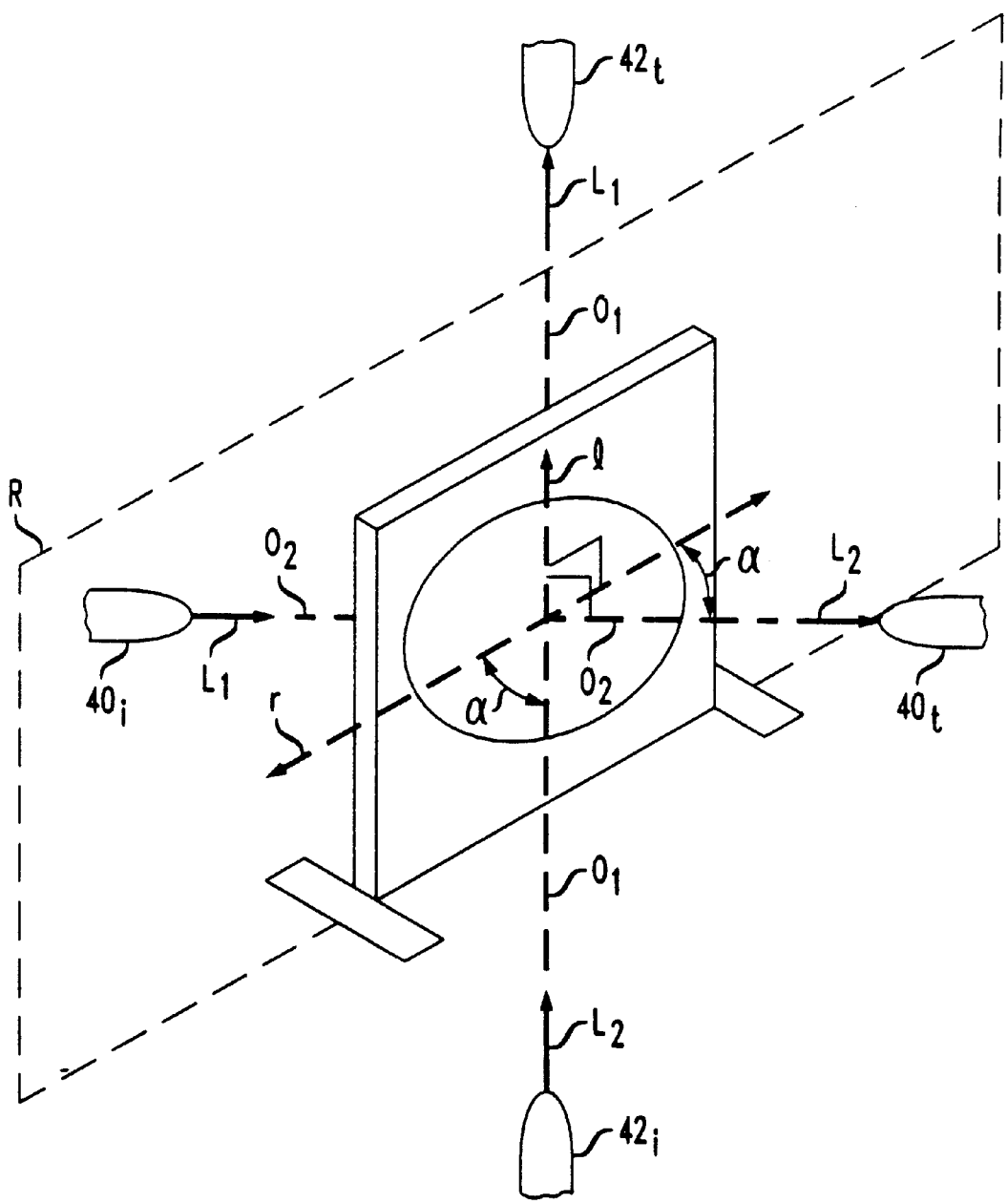
FIG. 11 is the symmetrical optical matrix crossconnect of the present invention in of FIG. 10 with the reflective element shown in a reflective state.

By way of example only, an optical switch device 20 used with the symmetrical optical matrix crossconnect apparatus 16 of the present invention is generally introduced in FIGS. 7–11. In FIG. 7, the optical switch device 20 includes the base member 8, the actuator 10, and a reflective element 22. The reflective element 22 is pivotally connected to the base member 8. The actuator 10 is connected to the base member 8 and the reflective element 22 and is operative to cause the reflective element to move to and between a reflective state as shown in FIG. 11 and a non-reflective state as shown in FIG. 10. The reflective state and the non-reflective state are discussed in more detail below.

The actuator 10 includes a hinge assembly 24 and a translation plate 26. The hinge assembly 24 has a pair of connecting rods 28. A first end 30 of each connecting rod 28 is pivotally connected to a respective one of a pair of arms 32 projecting from the reflective element 22. An opposite second end 34 of each connecting rod 28 is pivotally connected to the translation plate 26. The translation plate 26 is slidably connected to the base member 108 and moves between a first position $P_1$ where the reflective element 22 is in the reflective state and a second position $P_2$ where the reflective element 22 is in the non-reflective state.

As best shown in FIGS. 8 and 9, the reflective element 22 has a first reflective surface 36 disposed on a front side of the reflective element 22 and a second reflective surface 38 disposed on a rear side of the reflective element 22. Thus, when the reflective element 22 is in the reflective state, the reflective element is operative to reflect two separate beams of light, one from each reflective surface.

With reference to FIGS. 10 and 11, a second embodiment of the symmetrical optical matrix crossconnect apparatus 16 of the present invention includes a first pair of fiber optic ports 40$i$ and 40$t$. The first pair of fiber optic ports 40$i$ and 40$t$ are disposed apart from one another and aligned coextensively along a first optical path $O_1$. The fiber optic port 40$i$ is operative for emitting a first light beam $L_1$, i.e., inputs the first light beam $L_1$, that travels along the first optical path $O_1$ in free-space. Correspondingly, the fiber optic port 40$t$ receives the first light beam $L_1$, i.e., outputs the first light beam $L_1$, when the reflective element 22 is in the non-reflective state as illustrated by the phantomly-drawn reflective element in FIG. 10. When in the non-reflective state, the reflective element 22 is disposed away from the first and second optical paths $O_1$ and $O_2$, respectively.

The second pair of fiber optic ports 42$i$ and 42$t$ are also disposed apart from one another and aligned coextensively along a second optical path $O_2$. The fiber optic port 42$i$ of the second pair of fiber optic ports is operative for emitting a second light beam $L_2$, i.e., inputs the second light beam, which travels along the second optical path $O_2$ in free-space. The other fiber optic port 42$t$ of the second pair of fiber optic ports receives the second light beam, i.e., outputs the second light beam $L_2$, when the reflective element 22 is in the non-reflective state. The first optical path $O_1$ and the second optical path $O_2$ crisscross each other at an intersection I so that the respective light beams are transmitted between respective light-emitting and light-receiving fiber optic ports.

As shown in FIG. 11, the reflective element 22 in the reflective state is interposed into the first and second optical paths $O_1$ and $O_2$, respectively, at the intersection I. In the reflective state, the reflective element 22 reflects the first light beam $L_1$ emitted by the light-emitting fiber optic port 40$l$ of the first pair of fiber ports to the light-receiving fiber optic port 42$t$ of the second pair of fiber optic ports while the reflective element 22 reflects the second light beam $L_2$ emitted by the light-emitting fiber optic port 42$i$ of the second pair of fiber optic ports to the light-receiving fiber optic port 40$t$ of the first pair of fiber optic ports.

As shown in FIG. 11, the reflected element 22 defines a plane "p" that extends in a longitudinal direction "l" and a lateral direction "r" that is oriented orthogonally to the longitudinal direction "l". The first and second optical paths $O_1$ and $O_2$ are oriented perpendicularly relative to the longitudinal direction "l" and obliquely at an angle α relative to the lateral direction "r" when the reflective element 22 is in the reflective state.

Figure 12:
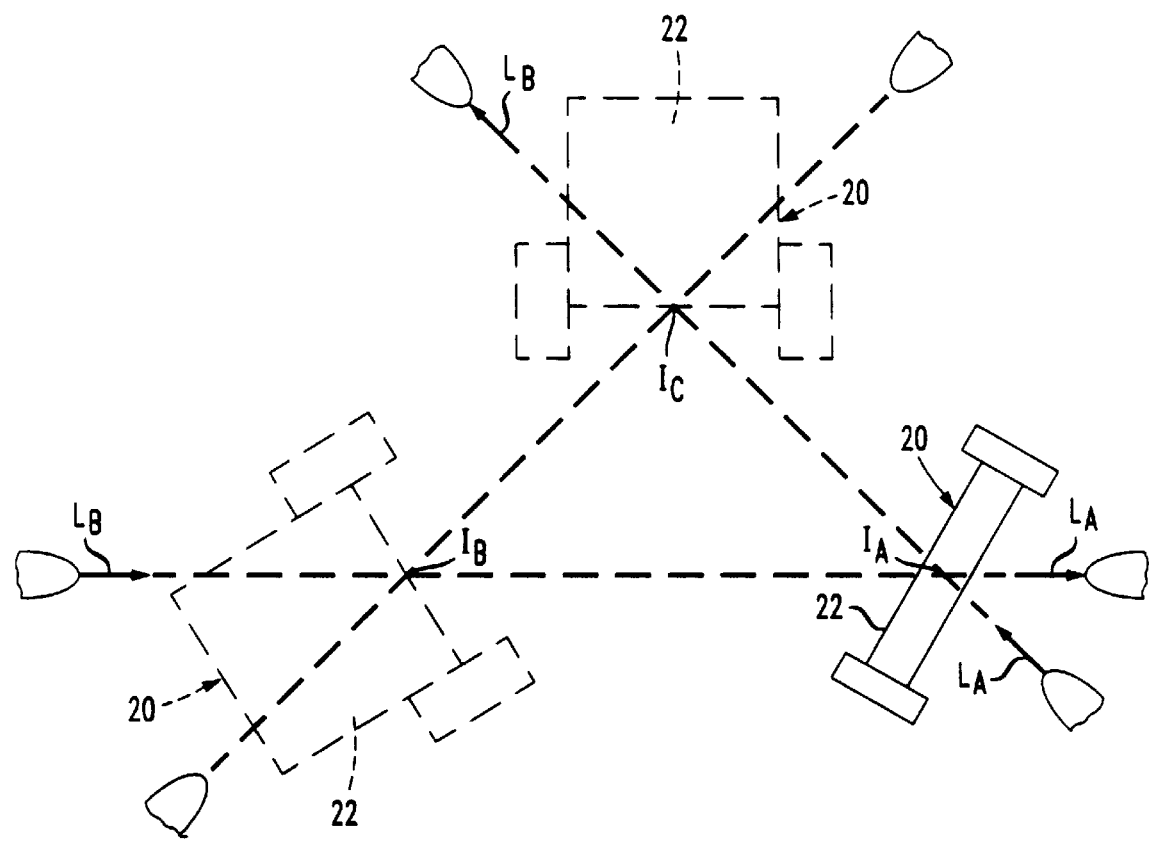
FIG. 12 is a third embodiment of the symmetrical optical matrix crossconnect of the present invention.

A third embodiment of the symmetrical optical matrix crossconnect apparatus 216 of the present invention is introduced in FIG. 12. An appropriately arranged plurality of the optical switch devices 20 of the present invention form the symmetrical optical matrix crossconnect apparatus 216. The symmetrical optical matrix crossconnect apparatus 216 is a simplified embodiment upon which more complex embodiments can be fabricated as described below. The symmetrical optical matrix crossconnect apparatus 216 redirects a selected two of three light beams traveling in free-space along respective paths. By way of example, light beams $L_A$ and $L_B$ are selected to be redirected from their respective optical paths $O_A$ and $O_B$. A third light beam $L_C$ travels along optical path $O_C$. Although for purposes of explaining the third embodiment of the symmetrical optical matrix crossconnect apparatus 216, light beam $L_C$ may or may not be present. The three optical paths $O_A$–$O_C$ form a plurality of light beam intersections $I_A$, $I_B$, and $I_c$. As shown in FIG. 12, only two of any of three $O_A$–$O_C$ crisscross at one intersection at a time to form the three intersections $I_A$–$I_C$. The symmetrical optical matrix crossconnect apparatus 216 includes the plurality of reflective elements 22 with each reflective element 22 having a first reflective surface and an opposite second reflective surface. Each reflective element 22 is associated with each light path intersection $I_A$–$I_C$. As discussed above, the reflective elements 22 are movable between the non-reflective state and the reflective state. In the non-reflective state, the reflected elements 22 are disposed away from the associated light path intersections which, in turn, permit the light beams to travel along their respective optical paths. In the reflective state, one reflective element 22 is interposed into the associated light path intersection while the remaining two reflective elements, drawn in phantom, are in the non-reflective state. By way of example, in FIG. 12, the reflective element 22 at intersection $I_A$ is interposed into the optical paths $O_A$ and $O_B$ of light beams $L_A$ and $L_B$. As a result, the light beam $L_A$ is redirected from the first reflective surface of the reflective element 22 while the second light beam $L_B$ is redirected from the second reflective surface.

One of ordinary skill in the art would appreciate that the symmetrical optical matrix crossconnect apparatus 216 illustrated in FIG. 12 operates when one reflective element is in the reflective state. The remaining reflective elements that are associated with the light paths intersections disposed along the crisscrossing optical paths in which the reflective element is interposed are in the non-reflective state.

Figure 13:
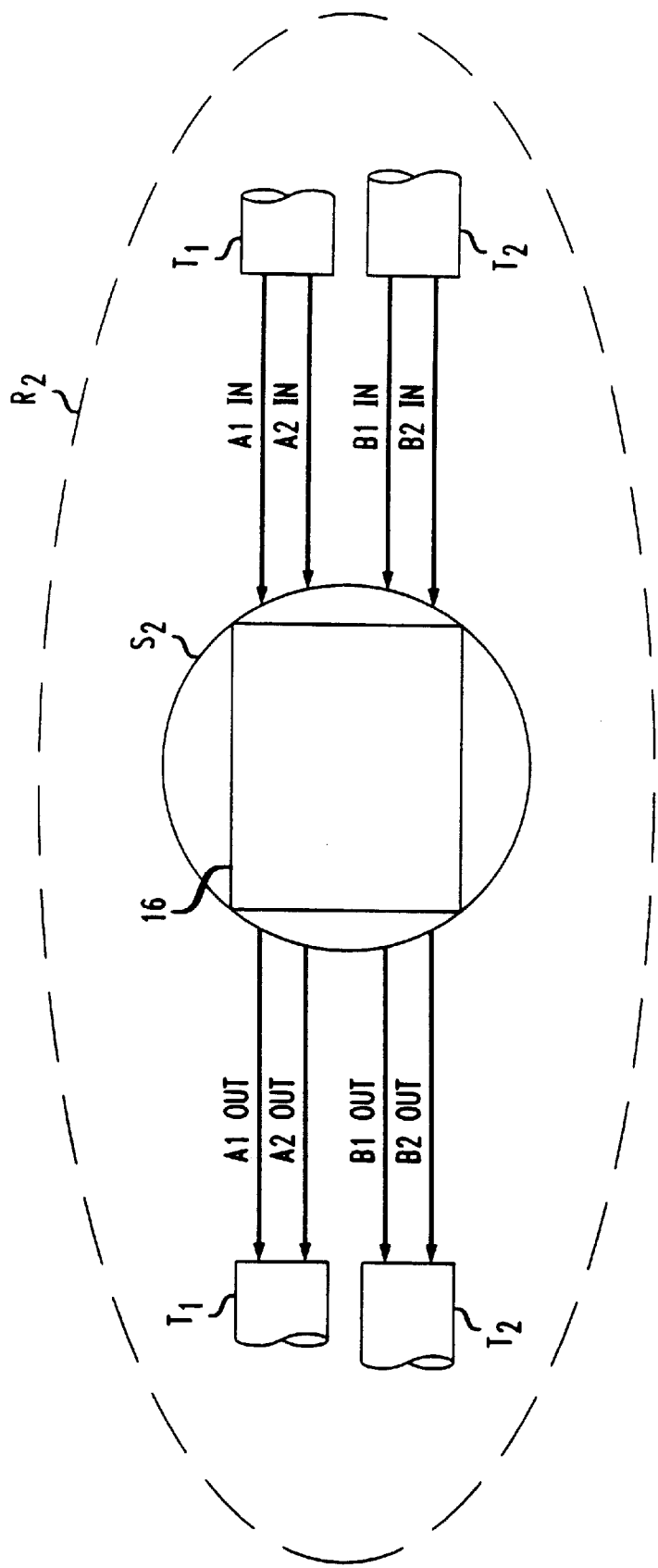
FIG. 13 is a block diagram showing a switching station connected to two neighboring switching stations.

The symmetrical optical matrix crossconnect apparatus of the present invention can be constructed to facilitate a variety of connections between or among switching stations. One example is shown in region R2 of the service area in FIG. 1 wherein switching station $S_2$ is connected to two trunk lines $T_1$ and $T_2$ with each trunk line having two bi-directional pairs of fiber optic parts A and B. The connections of switching station $S_2$ is illustrated in FIG. 13. The symmetrical optical matrix crossconnect apparatus necessary to facilitate this connection is shown in FIG. 6. The trunk line $T_1$ includes fiber optic ports A1 IN, A2 IN, B1 IN, and B2 IN. Correspondingly, trunk line $T_2$ includes B1 OUT, B2 OUT, A1 OUT, and A2 OUT. An example showing the operation of the symmetrical optical matrix crossconnect apparatus 16 shows light beam $L_A$ from fiber optic port A1 IN being reflected by the reflective element 12 in the reflective state to fiber optic port B2 OUT while light beam $L_B$ from fiber optic port B2 IN is reflected by an opposite reflective surface of the reflective element 12 to fiber optic port A1 OUT. As previously mentioned, for the optic matrix crossconnect apparatus to be symmetrical, then, if A1 IN is redirected to B2 OUT then B2 IN must be directed to A1 OUT. This example of the symmetrical optical matrix crossconnect apparatus is considered an N/2×N/2 matrix which can yield the same number of connections as a filly-connected N×N crossconnect with N equal to 4. In this example, the optical matrix crossconnect apparatus 16 of the present invention requires only 4 reflective elements compared to the fully-connected prior art crossconnect which requires 16 reflective elements.

Figure 14:
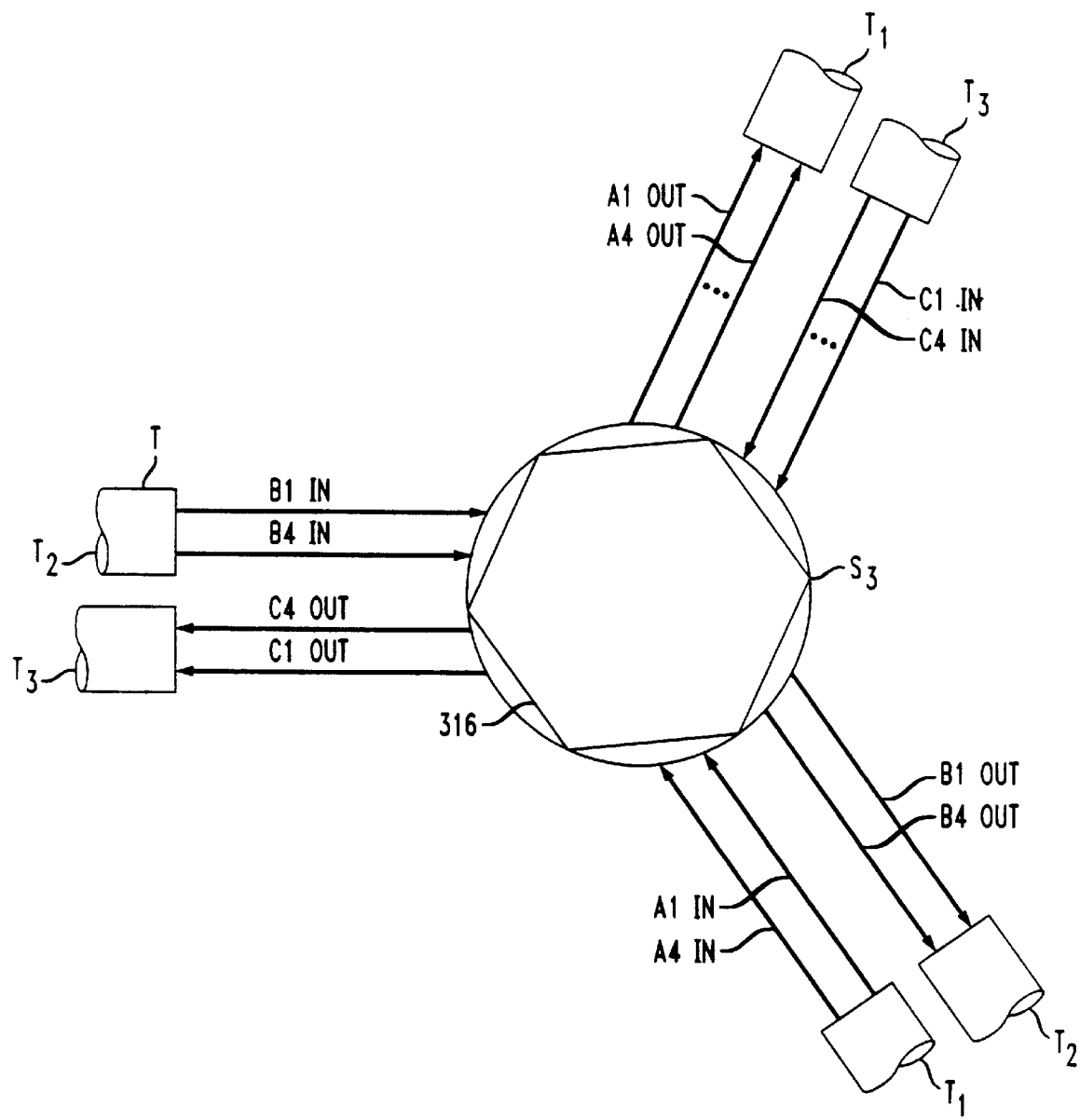
FIG. 14 is a diagram of a switching station connected to three neighboring switching stations.
Figure 15:
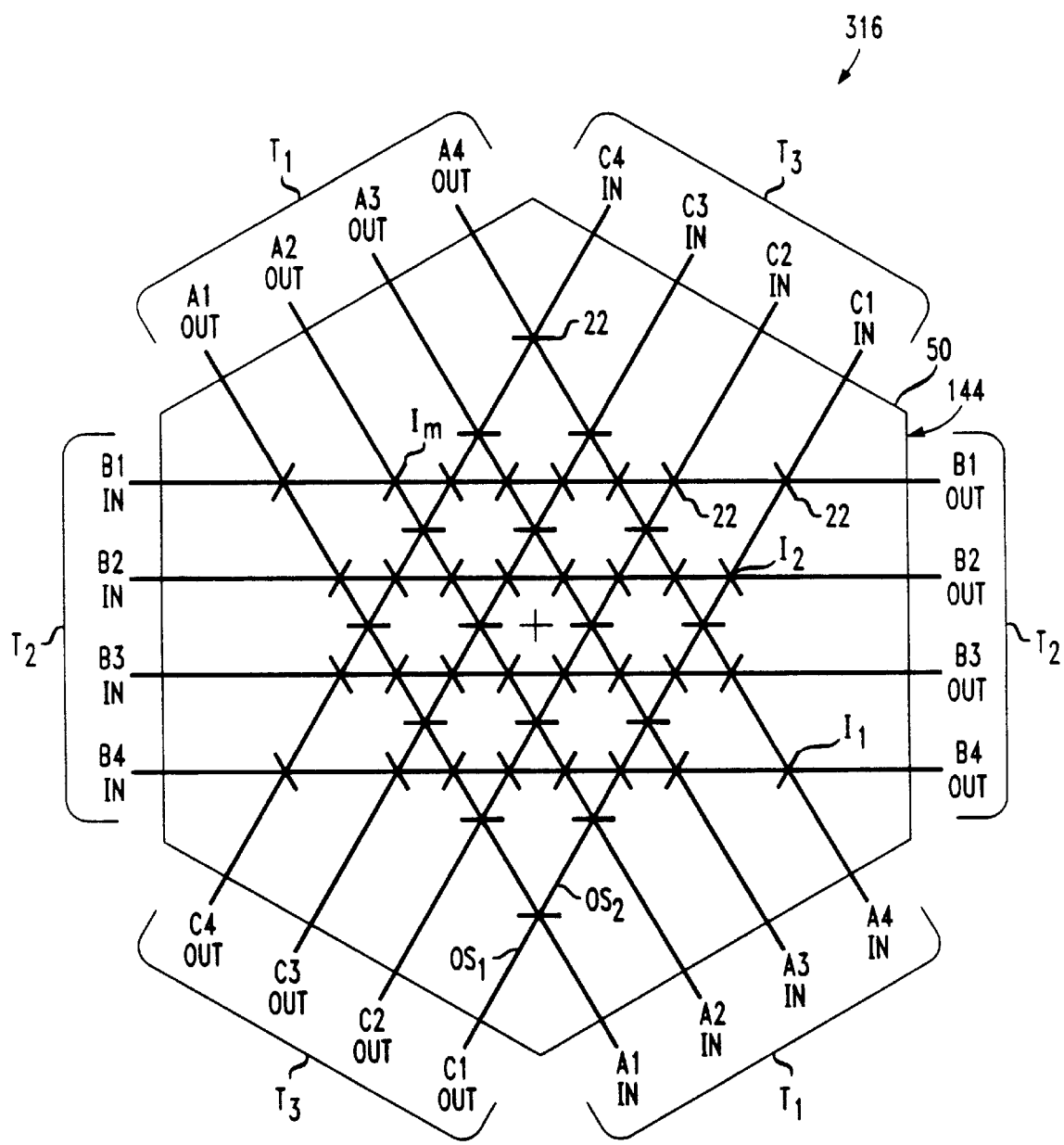
FIG. 15 is a block diagram of a fourth embodiment of the symmetrical optical matrix crossconnect apparatus used at a switching station connected to three neighboring switching stations.

A fourth embodiment of the symmetrical optical matrix crossconnect device 316 of the present invention is introduced in FIGS. 14 and 15. The application is shown in region R3 of the service area in FIG. 1. Here, switching station S3 has three connecting neighboring stations and therefore is connected to three trunk lines $T_1$, $T_2$ and $T_3$. This connection is represented in FIG. 14. To connect three trunk lines to switching station S3, the symmetrical optical matrix crossconnect apparatus 316 is required. The symmetrical optical matrix crossconnect apparatus 316 includes three sets $T_1$–$T_3$ of 4 bi-directional signal ports represented in FIG. 14 as A1 IN . . . A41 IN, for example.

Note that the three sets $T_1$–$T_3$ of the four bi-directional signal ports correspond to the trunk lines $T_1$–$T_3$ in region R3 of the service area in FIG. 1. The four bi-directional signal ports of each of the three sets $T_1$–$T_3$ are listed in Table I as follows:

TABLE I

| Set Number | First Bi-directional Signal Port | Second Bi-directional Signal Port | Third Bi-directional Signal Port | Fourth Bi-directional Signal Port |
|---|---|---|---|---|
| $T_1$ | A1 IN A1 OUT | A2 IN A2 OUT | A3 IN A3 OUT | A4 IN A4 OUT |
| $T_2$ | B1 IN B1 OUT | B2 IN B2 OUT | B3 IN B3 OUT | B4 IN B4 OUT |
| $T_3$ | C1 IN C1 OUT | C2 IN C2 OUT | C3 IN C3 OUT | C4 IN C4 OUT |

Thus, each bi-directional signal port includes a light emitting port, for example A1 IN, for emitting a beam of light and a light receiving port, for example A1 OUT, that receives another beam of light. The three sets of bi-directional signal ports are arranged around a periphery 50 of the symmetrical optical matrix crossconnect apparatus 316. As best shown in FIG. 15, the light emitting ports and the light receiving ports of each set of the bi-directional signal ports $T_1$–$T_3$ optically align with corresponding ones of the light receiving ports and the light emitting ports of the remaining two sets of the bi-directional signal ports. Specifically, the light emitting ports A1–A4 IN of set $T_1$ optically align opposite of the light receiving ports A1–A4 OUT of the set $T_1$; the light emitting ports B1–B4 IN of set $T_2$ optically align with the light receiving ports B1–B4 OUT of set $T_2$; and the light emitting ports C1–C4 IN of set $T_3$ optically align with light receiving ports C1–C4 OUT of set $T_3$.

In FIG. 15, a plurality of optical paths $O_1$–$O_n$ are formed and extend between the aligned ones of the respective light emitting ports and the light receiving ports. The plurality of optical paths $O_1$–$O_n$ crisscross one another to define a plurality of light beams $I_1$–$I_n$ with each light beam intersection $I_1$–$I_n$, being formed by only two crisscrossing optical path segments, for example, as shown by $OS_1$ and $OS_2$.

The symmetrical optical matrix crossconnect apparatus 316 also includes a plurality of reflective elements with each reflective element having a first reflective surface and an opposite second reflective surface. Each reflective element 22 is associated with a respective one of each light beam intersection and operative to move between the reflective state and the non-reflective state. In the non-reflective state, the respective ones of the reflective elements are disposed away from the associated light path intersections which in turn permit the intersecting light beams to travel along the respective optical paths. In the reflective state, at least one reflective element is interposed into the associated light path intersection thereby redirecting the light beams from their respective light emitting groups to selected ones of the light receiving groups.

The symmetrical optical matrix crossconnect apparatus also includes an actuator that moves one or a plurality of reflective elements between the reflective states and the non-reflective states.

The symmetrical optical matrix crossconnect apparatus 316 for switching station S3 is connected to three neighboring switching stations. The arrangement of the three sets of signal ports that include four bi-directional pairs of signal ports forms an imaginary six-sided polygon. By way of example, signal ports A1–4 IN and A1–4 OUT comprise the trunk line $T_1$, the signal ports B1–4 IN and B1–4 OUT comprise trunk line $T_2$, and signal ports C1–4 IN and C1–4 OUT comprise the trunk line $T_3$. Like the symmetrical optical matrix crossconnect apparatus described above connecting two neighboring switching stations, when at least one reflective element is in the reflective state, the remaining ones of reflective elements associated with the light path intersection and disposed along the crisscrossing optical paths in which the reflective element is interposed are in the non-reflective state.

Figure 16:
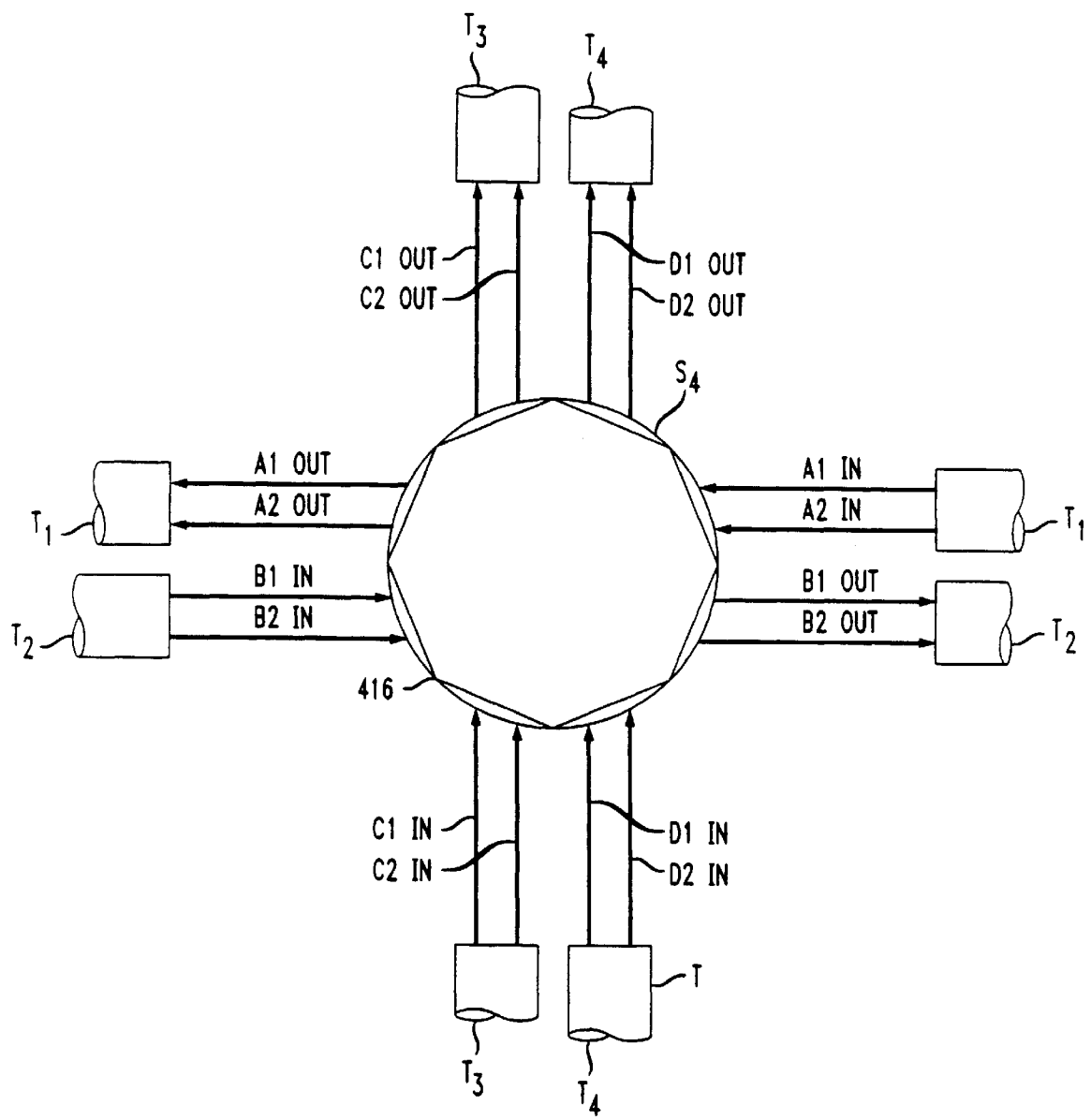
FIG. 16 is a block diagram illustrating a switching station connected to four neighboring switching stations.
Figure 17:
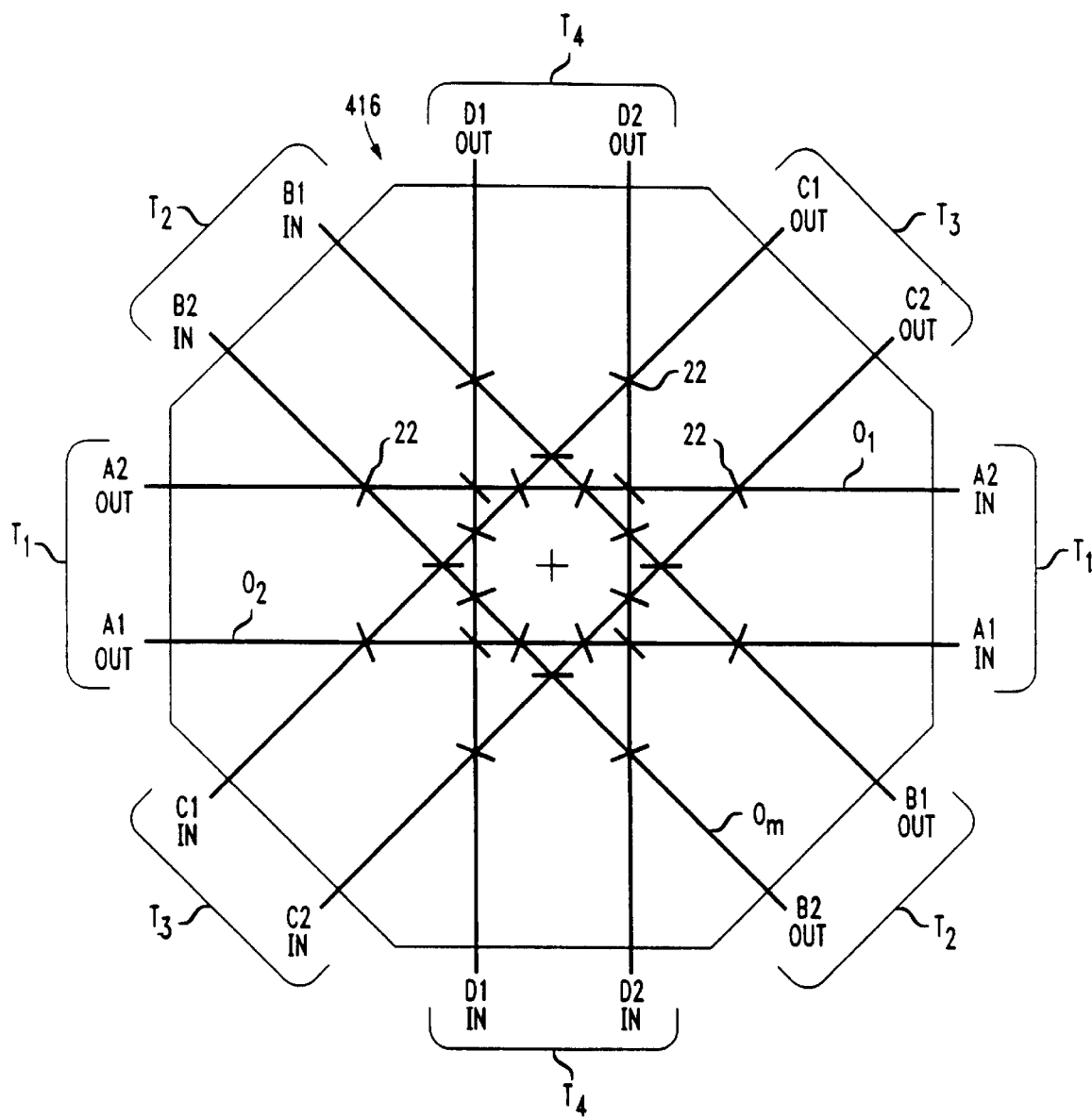
FIG. 17 is a fifth exemplary embodiment of the symmetrical optical crossconnect apparatus used at a switching station connected to four neighboring stations.

A fifth exemplary embodiment of a symmetrical optical matrix crossconnect apparatus 416 is introduced in FIGS. 16 and 17. The application of the symmetrical optical matrix crossconnect apparatus 416 is illustrated at region 4 of the service area in FIG. 1. At region R4, switching station S4 is connected to four neighboring switching stations by respective trunk lines $T_1$, $T_2$, $T_3$ and $T_4$. This four-switching station connection is illustrated in the block diagram in FIG. 16. To facilitate this connection, the symmetrical optical matrix crossconnect apparatus 416 is depicted in FIG. 17. Similar to the symmetrical optical matrix crossconnect apparatus 316 described above that connects three switching stations, the symmetrical optical matrix crossconnect apparatus 416 is configured in an imaginary eight-sided polygon. Four sets of signal ports with each set including two bi-directional signal ports form the symmetric optical matrix crossconnect apparatus 416 to connect the four switching stations. However, a skilled artisan would appreciate that each set includes at least one bi-directional signal port. Trunk line $T_1$ includes signal ports A1–4 IN and A1–4 out; trunk line $T_2$ includes signal ports B1–4 IN and B1–4 OUT; trunk line $T_3$, includes signal ports C1–4 IN and C1–4 OUT; and, trunk line $T_4$ includes signal ports D1–4 IN and D1–4 OUT.

As best shown in FIG. 17, the light emitting ports A1–2 IN of set $T_1$ optically align with light receiving ports A1–2

OUT of the set $T_1$ while the light emitting ports B1–2 IN of set $T_2$ optically align with the light receiving ports B1–2 OUT of set $T_2$. Correspondingly, the light emitting ports C1–2 IN of set $T_3$ optically align with the receiving ports C1–2 OUT in set $T_3$. Additionally, the light emitting ports D1–2 IN of set $T_4$ optically align with the light receiving ports D1–2 OUT of set $T_4$.

For the fifth exemplary embodiment of the symmetrical optical matrix crossconnect apparatus 416 of the present invention, respective pairs of inputs and outputs form respective pairs of parallel optical paths $O_1$–$O_n$.

Figure 18:
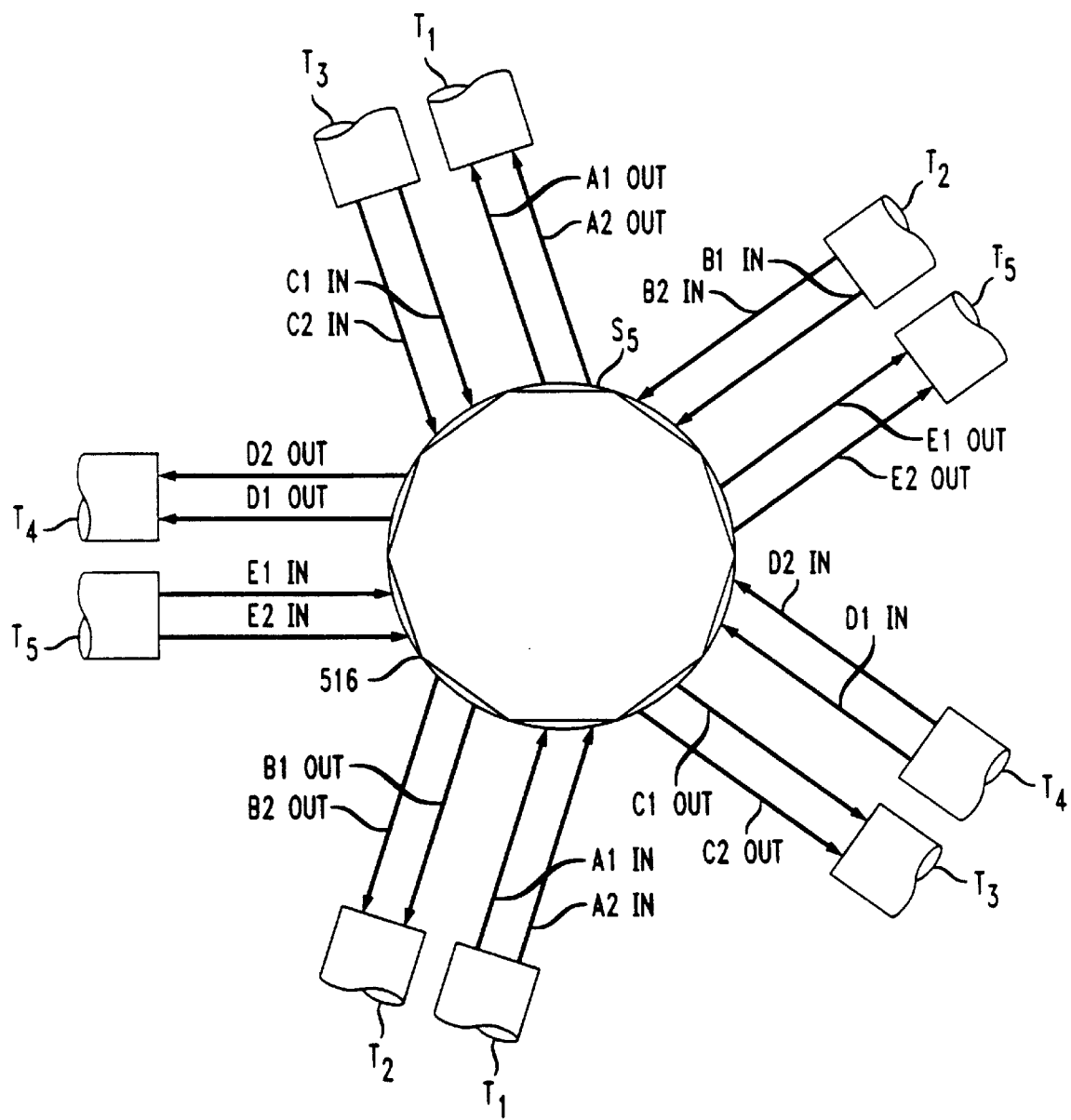
FIG. 18 is a block diagram of a switching station connected to five neighboring stations.
Figure 19:
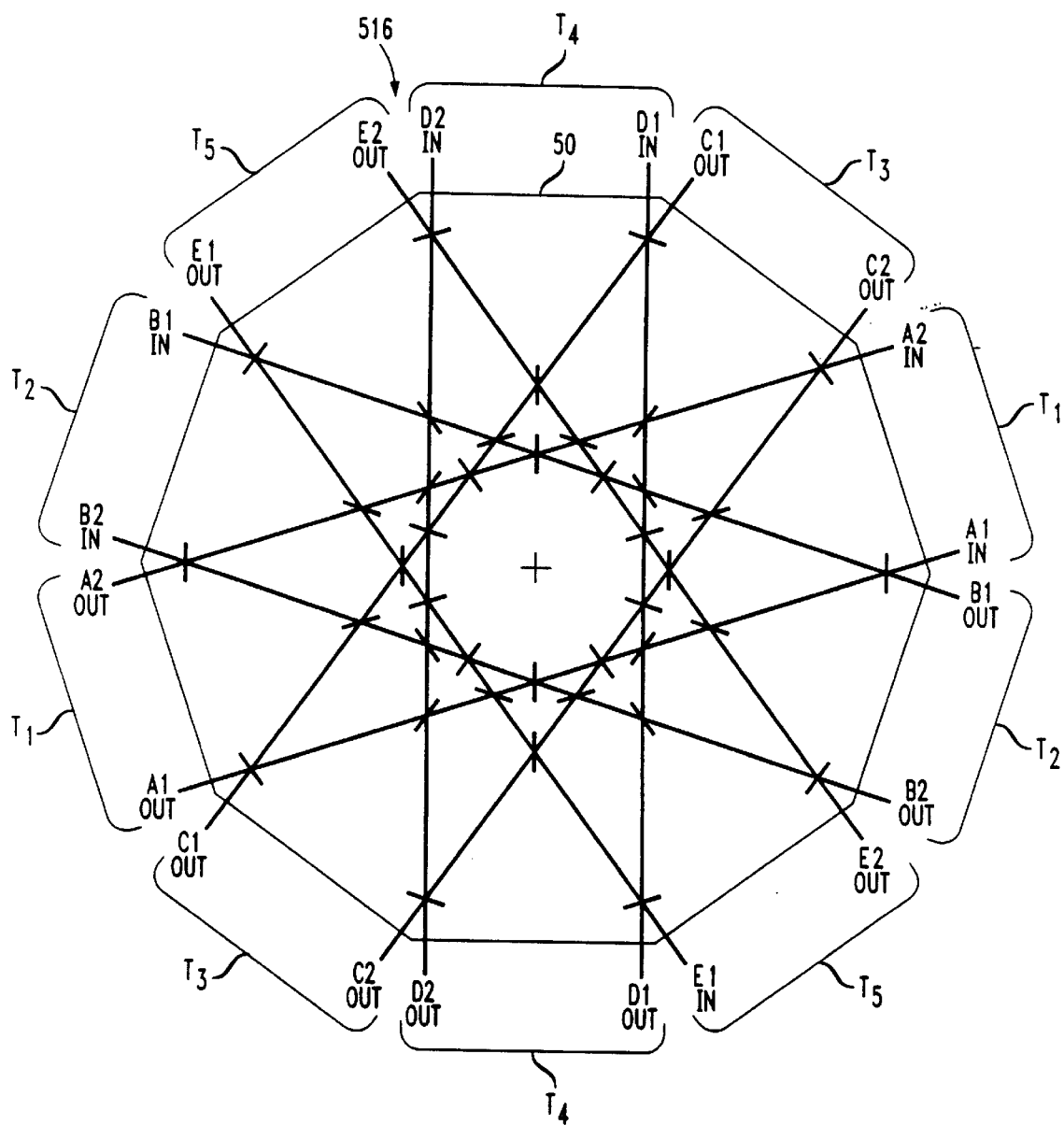
FIG. 19 is a sixth exemplary embodiment of the symmetrical optical matrix crossconnect apparatus used at a switching station connected to five neighboring stations.

A sixth exemplary embodiment of a symmetrical optical matrix crossconnect apparatus 516 is introduced in FIGS. 18 and 19. The application for using the symmetrical optical matrix crossconnect apparatus 516 is shown at region R5 of the service area in FIG. 1. At region R5, switching station $S_5$ is connected to five neighboring switching stations by trunk lines $T_1$–$T_5$. Switching station $S_5$ connected to five neighboring switching stations is illustrated in a block diagram in FIG. 18. The symmetrical optical matrix crossconnect apparatus 516 is required at switching station $S_5$ to facilitate connecting it with five neighboring stations. The symmetrical optical matrix crossconnect apparatus 516 includes five sets of signal ports with each set including two bi-directional signal ports, although a skilled artisan would appreciate that one or more sets might include at least one bi-directional signal port. The five sets of signal ports are organized as the trunk lines $T_1$–$T_5$ and are arranged in an imaginary ten-sided polygon about the periphery 50. Trunk line $T_1$ includes signal ports A1–2 IN and A1–2 out; trunk line $T_2$ includes signal ports B1–2 IN and B1–2 out; trunk line $T_3$ includes signal ports C1–2 OUT and C1–2 IN; trunk line $T_4$ includes signal ports D1–2 IN and D1–2 OUT; and trunk line $T_5$ includes signal ports E1–2 IN and E1–2 out.

The light emitting ports A1–2 IN are optically aligned with the light receiving ports A1–2 OUT in trunk line $T_1$ and the light receiving ports B–2 OUT of trunk line $T_2$ are optically aligned with the light emitting ports B1–2 IN of trunk line $T_2$. The light emitting ports C1–2 IN of trunk line $T_3$ are optically aligned with light receiving ports C1–2 OUT of trunk line $T_3$ while the light receiving ports D1–2 OUT of trunk line $T_4$ are optically aligned with the light emitting ports D1–2 IN of set $T_4$. Further, the light emitting ports E1–2 IN of set $T_5$ are optically aligned with the light receiving ports E1–2 OUT of set $T_5$.

Other symmetrical optical matrix crossconnect apparatuses can also be formed depending upon the number of neighboring switching stations to be connected. Based upon the imaginary three, four and five-sided polygons as illustrated in FIGS. 15, 17 and 19, one of ordinary skill in the art would appreciate that if Y number of switching stations are to be connected, then Y×2 is equal to the number of sides of the polygon required to connect Y switching stations. Therefore, Y is the number of sets of signal ports required to connect Y number of switching stations. For the imaginary six-sided, eight-sided and ten-sided polygons as shown in FIGS. 15, 17 and 19, Y equals an integer of 3, 4 and 5 respectively.

Figure 20:
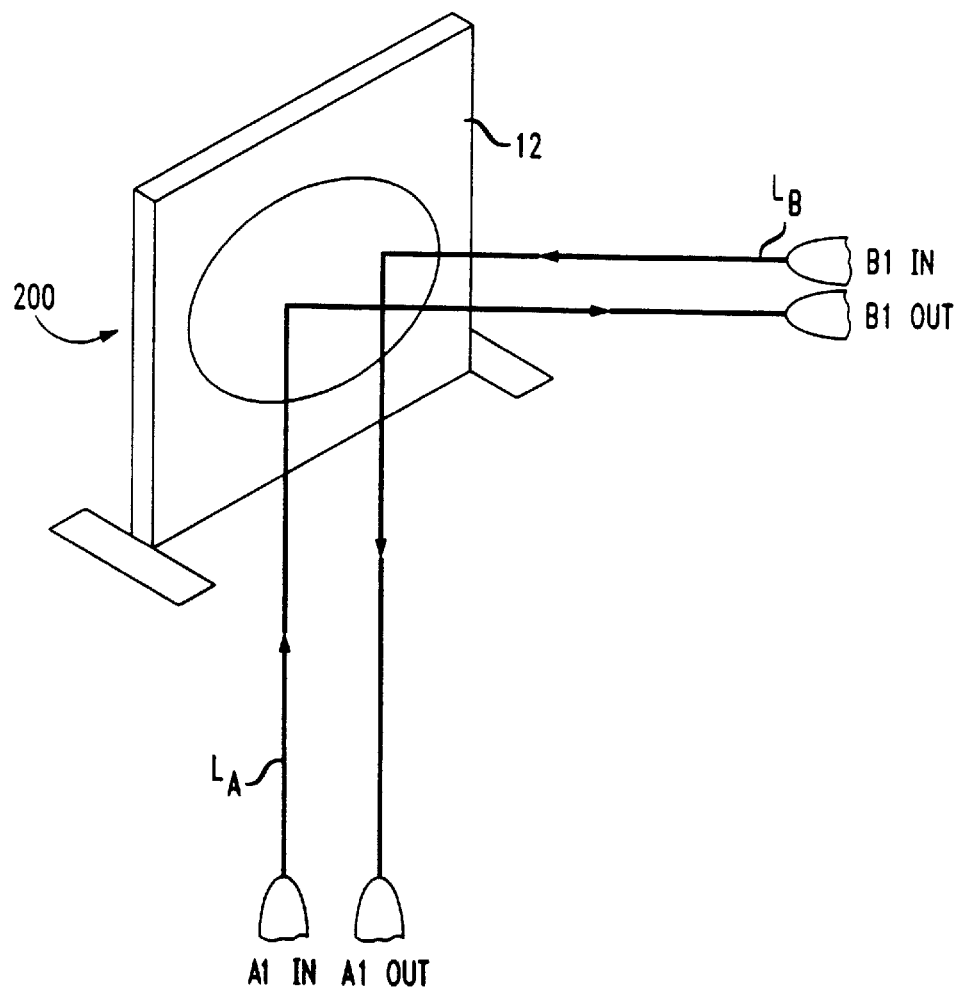
FIG. 20 is an alternative optical switch device for use with the symmetrical optical matrix switch apparatus of the present invention.
Figure 21:
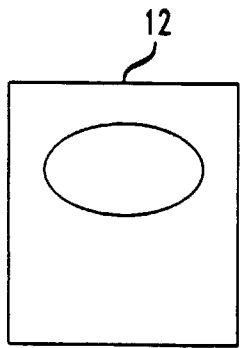
FIG. 21 is a front elevational view of the reflective element of the optical switch device shown in FIG. 20.
Figure 22:
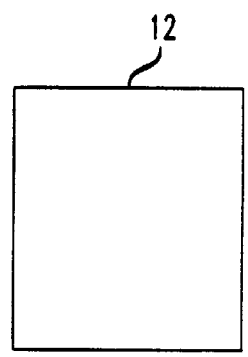
FIG. 22 is a rear elevational view of the reflective element of the optical switch device shown in FIG. 20.

An alternative optical switch device 200 is illustrated in FIGS. 20–22. The optical switch device 200 is similar to the optical switch device 20 described above. However, the optical switch device 200 is different in two respects. First, the reflective element 12 has only a first surface that is reflective. Two, the respective pairs of fiber optic ports are arranged juxtaposed to each other. Specifically, fiber optic ports A1 IN and A1 OUT are arranged side by side and fiber optic ports B1 IN and B1 OUT are also arranged side by side. The A pair of fiber optic ports and the B pair of fiber optic ports are arranged relative to the reflective element 12 such that when reflective element is in the reflective state, light beam $L_A$ emitted from fiber optic port A1 IN is redirected to fiber optic port B1 OUT while light beam $L_b$ emitted from fiber optic port B1 IN is also reflected from the reflective element 12 to fiber optic port A1 out. The optical switch device 200 is symmetrical because A1 IN goes to B1 OUT while B1 IN goes to A1 out.

Based on the above, there is a method for symmetrically crossconnecting a first light beam traveling in free space from a first input to a first output and a second light beam traveling in free space from a second input to a second output. The second input is different from the first input and the second output is different from the first output. The method includes the steps of directing the first and second light beams traveling from their respective first and second inputs to a reflecting element and reflecting the first and second light beams to redirect the first light beam to the second output and the second light beam to the first output.

Although not by way of limitation, an exemplary embodiment of the present invention can incorporate an optical switch device or optical switch devices as described in a co-pending patent application filed concurrently with the present application, entitled "Fiber Optic Free-Space Micromachined Matrix Switches" and identified under attorney docket number JAO 37661.

The present invention has been described with particularity in connection with the exemplary embodiments. However, it should be appreciated that changes may be made to the disclosed embodiments of the invention without departing from the spirit and inventive concepts defined in the following claims.

What is claimed is:

1. A symmetrical optical matrix crossconnect apparatus, comprising:

a first input and a second input different from the first input;

a first output and a second output different from the first output;

a first light beam traveling from the first input to the first output;

a second light beam traveling from the second input to the second output; the first and second light beams crisscrossing each other at an intersection, and a reflecting element disposed at the intersection of the first and second light beams, the reflecting element reflecting the first and the second light beams to redirect the first light beam to the second output and the second light beam to the first output.

2. The symmetrical otical matrix crossconnect apparatus of claim 1, further comprising:

a first pair of fiber optic ports disposed apart from one another and aligned coextensively along a first optical path, respective ones of the first pair of fiber optic ports operative for emitting and receiving a first light beam traveling along the first optical path in free space;

a second pair of fiber optic ports disposed apart from one another and aligned coextensively along a second optical path, respective ones of the second pair of fiber optic ports operative for emitting and receiving a second light beam traveling along the second optical path in free space, the first optical path and the second optical path crisscrossing each other at an intersection; and a reflective element for reflecting the first light beam emitted by a light emitting first one of the first pair of fiber optic ports to a light receiving second one of the second pair of fiber optic ports while reflecting the second light beam emitted by a light emitting second one of the second pair of fiber optic ports to a light receiving first one of the first pair of fiber optic ports by moving the reflective element between a non-reflective state and a reflective state, the reflective element being disposed away from the first and second optical paths in the non-reflective state and being interposed into the first and second optical paths at the intersection in the reflective state.

3. The symmetrical optical matrix crossconnect apparatus according to claim 2, wherein the reflective element has a first reflective surface and an opposite second reflective surface.

4. The symmetrical optical matrix crossconnect apparatus according to claim 2, further comprising a base member and an actuator, the base member having the reflective element pivotally connected thereto, the actuator connected to the base member and the reflective element and operative to cause the reflective element to move to and between the reflective state and the non-reflective state.

5. The symmetrical optical matrix crossconnect apparatus according to claim 4, wherein the actuator includes a hinge assembly and a translation plate, the hinge assembly having at least one connecting rod with a first end of the connecting rod pivotally connected to the reflective element and an opposite second end pivotally connected to the translation plate, the translation plate slidably connected to the base member and movable between a first position wherein the reflective element is in the reflective state and a second position wherein the reflective element is in the non-reflective state.

6. The symmetrical optical matrix crossconnect apparatus according to claim 2, wherein the reflective element defines a plane extending in a longitudinal direction and a lateral direction being orthogonal to the longitudinal direction, the optical paths being oriented perpendicularly relative to the longitudinal direction and obliquely relative to the lateral direction when the reflective element is in the reflective state.

7. The symmetrical opticl matrix crossconect apparatus of claim 1, further comprising:

M pairs of fiber optic ports wherein M is an integer greater than 1, each pair of fiber optic ports including a light emitting port for emitting a beam of light and a light receiving port for receiving another beam of light, the light emitting port and light receiving port of each pair of fiber optic ports defining one optical path, the plurality of optical paths crisscrossing one another to define a plurality of light beam intersections with each light beam intersection formed by only two crisscrossing optical path segments;

one or more reflective elements, each reflective element having a first reflective surface and an opposite second reflective surface, being associated with a respective one of each light beam intersection and operative to move between a non-reflective state whereby respective ones of the reflective elements are disposed away from the associated light path intersections thereby permitting two intersecting light beams to travel along respective optical paths from a first light emitting port to a corresponding first light receiving port and from a second light emitting port to a corresponding second light receiving port, and a reflective state whereby one reflective element is interposed into the light beam intersection where the two intersecting light beams crisscross thereby redirecting one light beam from the first light emitting port to the second light receiving port and a remaining light beam from the second light emitting port to the first light receiving port; and at least one actuator, each actuator being associated with at least one reflective element, the actuator being operative to move each associated reflective element between the reflective states and the non-reflective states.

8. The symmetrical optical matrix crossconnect apparatus according to claim 7, wherein M is selected from a group of integers consisting of 3, 4 and 5.

9. The symmetrical optical matrix crossconnect apparatus according to claim 8, wherein when at least one reflective element is in the reflective state, remaining ones of the reflective elements disposed along the crisscrossing optical paths in which the reflective element is interposed are in the non-reflective state.

10. The symmetrical optical matrix crossconnect apparatus according to claim 8, comprising one actuator that moves all the reflective elements.

11. The symmetrical optical matrix crossconnect apparatus of claim 1, wherein the reflective element has a first reflective surface disposed on the front side of the reflective element and a second reflective surface disposed on the rear side of the reflective element.

12. A symmetrical optical matrix crossconnect apparatus for redirecting a selected two of at least three light beams traveling in free space along respective optical paths, the at least three light beams being oriented so that the at least three light beams crisscross to form a plurality of light beam intersections with only two of the light beams crisscrossing at one intersection at a time; the symmetrical optical matrix crossconnect comprising:

a plurality of reflective elements for redirecting at least a first one of the light beams from a first reflective surface of a reflective element while redirecting at least a second one of the light beams from a second reflective surface of the reflective element.

13. The symmetrical optical matrix crossconnect apparatus according to claim 12, wherein when one reflective element is in the reflective state, remaining ones of the reflective elements associated with the light path intersections disposed along the crisscrossing optical paths in which the reflective element is interposed are in the non-reflective state.

14. The symmetrical optical matrix crossconnect apparatus of claim 12, wherein each reflective element having a first reflective surface and an opposite second reflective surface and associated with each light path intersection, each reflective element movable between a non-reflective state whereby respective ones of the reflective elements are disposed away from the associated light path intersections thereby permitting the light beams to travel along the respective optical paths and a reflective state whereby at least one reflective element is interposed into the associated light path intersection thereby redirecting a first one of the light beams from the first reflective surface while redirecting a second one of the light beams from the second reflective surface.

15. A method for symmetrically crossconnecting a first light beam traveling in free space from a first input to a first output and a second light beam traveling in free space from a second input different from a first input to a second output different from the first output the first and second light beams crisscrossing each other at an intersection, the method comprising the steps of:

disposing a reflective element at the intersection of the first and second light beams;

directing the first and second light beams traveling from the respective first and second inputs to the reflecting element; and reflecting the first beams to redirect the first light beam to the second output and the second light beam to the first output.

16. The method according to claim 15, wherein the reflective element has a first reflective surface and an opposite second reflective surface, the first beam reflecting on the first reflective surface in the non-reflective state and the second beam reflecting on the second reflective surface in the reflective state.

17. The method of claim 15, wherein the first light beam is reflected by a front side of the reflective element to redirect the first light beam to the second output and the second light beam is reflected by a rear side of the reflective element to redirect the second light beam to the first output.

18. A method for symmetrically crossconnecting a symmetrical optical matrix for redirecting a selected two of at least three light beams traveling in free space along respective optical paths, the at least three light beams being oriented so that the at least three light beams crisscross to form a plurality of light beam intersections with only two of the light beams crisscrossing at one intersection at a time, the method comprising:

redirecting at least a first one of the light beams from a first reflective surface of a reflective element while redirecting at least a second one of the light beams from a second reflective surface of the reflective element.

19. The method according to claim 18, wherein when one reflective element is in the reflective state, remaining ones of the reflective elements associated with the light path intersections disposed along the crisscrossing optical paths in which the reflective element is interposed are in the non-reflective state.

* * * * *